(12) United States Patent  
Finkler et al.

(10) Patent No.: US 8,230,667 B2  
(45) Date of Patent: Jul. 31, 2012

(54) SELF-PROPELLED HARVESTING MACHINE

(75) Inventors: Jan Finkler, Nohfelden Elweiler (DE); Jürgen Hofer, Großbundenbach (DE); Ignatz Wendling, Zweibrücken (DE)

(73) Assignee: Deere & Company, Moline, IL (US)

( * ) Notice: Subject to any disclaimer, the term of this patent is extended or adjusted under 35 U.S.C. 154(b) by 240 days.

(21) Appl. No.: 12/712,915

(22) Filed: Feb. 25, 2010

(65) Prior Publication Data

US 2011/0203243 A1    Aug. 25, 2011

(30) Foreign Application Priority Data

Feb. 27, 2009 (DE) .................. 10 2009 001 208  
Jul. 31, 2009 (DE) .................. 10 2009 028 175

(51) Int. Cl.  
*A01B 79/00* (2006.01)

(52) U.S. Cl. .................. 56/10.2 A; 56/10.2 G; 701/50

(58) Field of Classification Search .......... 56/102 R, 56/10.2 A, 10.2 G, 10.2 H; 460/1, 6; 701/50  
See application file for complete search history.

(56) References Cited

U.S. PATENT DOCUMENTS

| | | | |
|---|---|---|---|
| 6,553,302 B2 * | 4/2003 | Goodnight et al. | 701/54 |
| 6,865,870 B2 * | 3/2005 | Heisey | 56/10.2 G |
| 2003/0126845 A1 * | 7/2003 | Heisey | 56/10.2 G |
| 2007/0191179 A1 * | 8/2007 | Hugenroth et al. | 477/2 |
| 2010/0010703 A1 | 1/2010 | Coates et al. | |
| 2010/0145581 A1 * | 6/2010 | Hou | 701/50 |

FOREIGN PATENT DOCUMENTS

| | | |
|---|---|---|
| DE | 200 234 A1 | 9/1981 |
| DE | 35 05 887 A1 | 2/1985 |
| DE | 199 03 471 C1 | 1/1999 |
| DE | 102 25 716 A1 | 11/2002 |
| DE | 10 2006 004 143 A1 | 1/2006 |
| DE | 10 2007 004 576 A1 | 7/2008 |
| DE | 10 2007 058 535 A1 | 6/2009 |
| EP | 0 901 928 A2 | 11/1998 |
| EP | 1 052 388 A2 | 4/2000 |
| EP | 1 232 682 A1 | 2/2002 |
| EP | 1 236 389 A1 | 2/2002 |
| EP | 1 275 290 A1 | 7/2002 |
| EP | 1 344 444 A1 | 2/2003 |
| EP | 1 419 687 A1 | 10/2003 |
| EP | 1 523 872 A1 | 10/2004 |
| EP | 1 609 349 A1 | 6/2005 |
| EP | 1658765 A1 | 5/2006 |
| EP | 1 818 524 A1 | 11/2006 |
| EP | 1946631 | 7/2008 |
| EP | 2057881 | 5/2009 |

OTHER PUBLICATIONS

European Search Report received May 19, 2010 (5 pages).  
European Search Report, 7 Pages, Sep. 3, 2010.

* cited by examiner

*Primary Examiner* — Alicia Torres

(57) ABSTRACT

A self-propelled harvesting machine includes an internal combustion engine and an electronic control arrangement that is coupled to the internal combustion engine and that is provided as input the rotational speed of the internal combustion engine and that can be provided with information as to whether the harvesting machine is in operation on public roads or in a harvesting operation. The control arrangement provides as input during the harvesting operation in an automatic operating mode the rotational speed of the internal combustion engine as a function of the situation in a harvesting operation of the harvesting machine as controlled by the control arrangement. In addition, the internal combustion engine can be operated in an efficient operating mode at a local minimum of the specific fuel consumption.

32 Claims, 5 Drawing Sheets

SELF-PROPELLED HARVESTING MACHINE

FIELD OF THE INVENTION

The invention concerns a self-propelled harvesting machine, including an internal combustion engine, and an electronic control arrangement coupled to the internal combustion engine that can provide as input the rotational speed of the engine, and to which information can be supplied whether the harvesting machine is in operation on public roads or in harvesting operation.

BACKGROUND OF THE INVENTION

Self-propelled agricultural harvesting machines, for example combines and forage harvesters, are usually driven by means of internal combustion engines. In the simplest case the rotational speed of the internal combustion engine is provided as an input by the operator, for the purpose of which rotary knobs or other operating elements are provided, whose position is detected by a sensor and transmitted to an electronic engine control arrangement. The electronic engine control arrangement then adjusts the rotational speed of the internal combustion engine according to the operator's input. During the harvesting process the operator adjusts to a relatively high engine rotational speed suggested by the manufacturer. The rotational speed of the internal combustion engine is then lowered during the harvesting operation as a function of the actual harvested crop throughput, where the operator endeavors to maintain an appropriate engine rotational speed that is slightly below the adjusted engine rotational speed for the forward propulsion velocity provided as input by means of an operating lever. Accordingly frequent changes in the forward propulsion velocity are necessitated by variations in the density of the stand of the harvested crop on the field. This requires the constant attention of the operator and has been shown to be tiring for the operator. The engine rotational speed can be lowered to the point of stopping the engine by very high loads of the harvesting machine occasioned by dense stands of the crop and/or excessively high forward propulsion velocity.

It has been proposed furthermore (DE 35 05 887 A1) that the rotational speed of the chopper drum and the drive torque of the preceding units be detected and to lower the forward propulsion velocity, when the rotational speed of the chopper drum is below a certain value or the drive torque is above a certain value. Analogously the forward propulsion velocity is increased when certain values of the rotational speed are exceeded or the drive torque is below certain values. Thereby the rotational speed of the combustion engine is held at all times, within a range of rotational speeds that lies below the maximum rotational speed. In this arrangement the fuel supply for the internal combustion engine and its rotational speed is not changed by the control arrangement. The rotational speed of the internal combustion engine remains relatively high even in times of relatively low load, for example, during the turn at the end of the field while stopped or during operation on public roads, which leads to excessively high fuel consumption. A similar control arrangement is seen in EP 1 419 687 A1, where the forward propulsion velocity depends upon the power developed for the main unit (for example, a threshing drum or chopper drum) and for the auxiliary units, for example, the forward propulsion drive, and is adjusted in such a way that the maximum power output of the internal combustion engine is not exceeded.

In addition EP 1 275 290 A1 proposed that the rotational speed of the internal combustion engine of a forage harvester be selected as a function of the type of the front harvesting attachment and the length of the exhaust stack of the forage harvester.

EP 1 232 682 A1 proposes that the power output curve of the engine control of an internal combustion engine of a combine be selected as a function of the type of the front harvesting attachment.

EP 1 236 389 A1 proposes that the rotational speed of the internal combustion engine of a forage harvester be controlled as variable by the operator, but also to provide a lower limit of the rotational speed in order to avoid the exhaust blower from jamming which was operated at a constant gear ratio with the internal combustion engine.

EP 0 901 928 A2 proposes that the load required by the output drive of the internal combustion engine be detected and to reduce the rotational speed of the internal combustion engine when a threshold value is exceeded.

EP 1 609 349 A1 proposes that the internal combustion engine of a self-propelled harvesting machine be operated at a variable rotational speed that is a function of the actual throughput. The forward propulsion velocity of the harvesting machine is provided as input by the operator and is independent of the throughput.

DE 10 2007 004 576 A1 describes a forage harvester in which the engine rotational speed is reduced at relatively high harvested crop throughput in comparison to the maximum rotational speed, while the forward propulsion velocity is increased in order to reduce the fuel consumption. This utilizes the fact that lower acceleration of the harvested crop is sufficient for the higher throughput values in order to expel the harvested crop from the harvesting machine.

EP 1 818 524 A1 describes a self-propelled forage harvester with two internal combustion engines. A first internal combustion engine is operated at its maximum output, while at part load operation the second internal combustion engine is operated at the same rotational speed with lower power output, so that both engines operate along the same fuel consumption characteristics.

DD 200 234 A1 proposes that the engine rotational speed of the internal combustion engine of a combine be reduced during operation on public roads relative to the rotational speed during the harvesting operation, where the operation on public roads is recognized on the basis of the associated gear ratio of a shifted gear box. Both rotational speeds are provided as a fixed input.

EP 1 052 388 A2 proposes that the rotational speed of the internal combustion engine of a self-propelled harvesting machine be adjusted during operation on public roads on the basis of the forward propulsion velocity provided as input. The operation on public roads is recognized on basis of the position of an operating element that differs during operation on public roads from that during the harvesting operation. When the harvesting machine is stopped the engine rotational speed is lower than during operation of the harvesting machine.

Accordingly it is common practice in the state of the art to maintain the rotational speed and the power output of the internal combustion engine of a self-propelled harvesting machine as constant as possible, that is performed by automatically varying the forward propulsion velocity of the harvesting machine (DE 35 05 887 A1, EP 1 419 687 A1, EP 0 901 928 A2) or to maintain the forward propulsion velocity as constant and to vary the rotational speed of the internal combustion engine (EP 1 609 349 A1). In addition, it is common practice to vary the rotational speed of the internal combustion engine in order to make the power output conform to varying harvest crop throughput values. Thereby the rotational speed of the internal combustion engine is reduced relative to the nominal rotational speed when the power output is to be reduced relative to the nominal power output (compare EP 1 232 682 A1, EP 1 236 389 A1, EP 1 275 290 A1, and DE 10 2007 004 576 A1) Particularly during the harvesting operation this results in the disadvantage that the rotational speed of the harvested crop processing element is not reduced unless they are driven by costly gear boxes at constant speeds independently of the rotational speed of the internal combustion engine, which, however, leads to less than optimum harvested crop processing and harvested crop conveying. An automatic reduction of the rotational speed as a function of a known operating mode of the harvesting machine has so far been proposed only for operation on public roads (DD 200 234 A1, EP 1 052 388 A2). It would also be useful during the harvesting operation to lower the rotational speed of the internal combustion engine relative to the rotational speed selected for full power operation if the harvesting machine is running or is stopped, for example, ahead of the turn at the head of a field in order to wait for a transport vehicle upon which the harvested crop is to be transferred.

SUMMARY OF THE INVENTION

The purpose underlying the invention is seen in the need to create a drive system for a harvesting machine that operates during the harvesting operation as economical as possible with respect to fuel consumption.

According to a first aspect of the invention a self-propelled harvesting machine that may, for example, be a self-propelled combine, forage harvester, cotton picker or a self-propelled mowing machine includes an internal combustion engine and an electronic control arrangement, that is coupled to the internal combustion engine and can provide as input the rotational speed of the internal combustion engine. The control arrangement is provided with information whether the harvesting machine is in operation on public roads or in harvesting operation. When the harvesting machine is in the harvesting operation, the control arrangement provides as input the rotational speed of the internal combustion engine in an automatic operating mode as a function of the operating situation of the harvesting machine recognized by the control arrangement.

Accordingly, the control arrangement is informed whether the harvesting machine happens to be in the harvesting operation or not, this can be performed by means of a switch, known in itself, with which the harvesting machine can be switched from operation on public roads to the harvesting operation (see EP 1 523 872 A1), or on the basis of the position of the operating elements of the harvesting machine on the basis of which a decision can be made whether the harvesting machine happens to be in a harvesting operation or in operation on public roads, as is described in EP 1 052 388 A2. The disclosures of both publications mentioned are incorporated by reference into the present document.

If the harvesting machine now is in the harvesting operation, the actual harvesting operation situation is recognized, that is performed in particular on the basis of input from the operator and/or the adjustment magnitudes affected by the operator inputs that are used for the control of the forward propulsion drive or the harvesting operation. In this way, for example, a stop, an idling operation without harvested crop being taken up, or headland operation, or the actual harvesting operation can be recognized. The recognition of the harvesting operation situation is performed in particular independently of sensors for the detection of the throughput, although such sensors could also be used, for example, to recognize whether harvested crop still remains in the harvesting machine or not, during headland operation. The rotational speed of the internal combustion engine is provided as input according to the situation of the harvesting operation. In that way, for example, during a stop (that can be recognized on the basis of the actual forward propulsion velocity, whose target and/or actual value is detected) an idle rotational speed is selected or the internal combustion engine is stopped after a certain time interval, during the idle operation (that can be recognized on the basis of the actual forward propulsion velocity, whose target and/or actual value is detected and/or the position of a front harvesting attachment and/or the mode of operation of an intake conveyor) a constant or variable rotational speed can be selected between the idle rotational speed and a maximum rotational speed, particularly as long as no harvested crop remains inside the harvesting machine (then a higher rotational speed is selected or maintained, in order to assure an orderly conveying away of the harvested crop) and during the harvesting operation (that can be recognized on the basis of the actual forward propulsion velocity, whose target and/or actual value is detected, and information regarding the engaged position of a clutch in the drive line of the operating element required for the harvesting operation) and utilizes the maximum rotational speed or a rotational speed just below it, that in particular permits a maximum power output or that corresponds to a local minimum specific fuel consumption.

The maximum speed of the internal combustion engine (or a rotational speed that can be selected by the operator for the harvesting operation) is used particularly when the harvesting machine enters a field that is to be harvested, in order to assure that the harvested crop conveying arrangements operate at the highest possible rotational speed, in particular the conveying arrangements of a forage harvester arranged downstream of a chopper drum, in order to convey away the small harvested crop throughput in the proper order, that is, without any jams in this harvesting situation. This situation of the harvesting operation can be recognized and is a function of the forward propulsion velocity, whose target or actual value is detected, and information regarding the engaged position of a clutch in the drive line of the operating elements required for the harvesting operation and/or the operating mode of an intake conveyor, where in addition the initiation of the harvesting operation can be recognized on the basis of an exact time line back by a certain time interval by the engagement of the clutch.

If an increased load of the internal combustion engine exists after the entry into the field a normal harvesting operation is assumed initially, so that the control arrangement selects a rotational speed that lies below the maximum rotational speed. Here the rotational speed of the internal combustion engine is preferably held constant initially while the load increases until a certain first value of the power output is reached. With further increasing load the rotational speed is reduced continuously, in particular, linearly as a function of the load, until a rotational speed value is reached at a second value of the power output that corresponds to a maximum power output that can be delivered or to a local minimum of the specific fuel consumption. With further increasing load, the rotational speed then remains constant, until a maximum load is reached. If the load should increase further starting from the maximum deliverable power output of the internal combustion engine, then either the rotational speed of the internal combustion engine will necessarily decrease on the basis of the operating characteristics of the internal combustion engine or the control arrangement brings about a reduction of the forward propulsion velocity of the harvesting machine and in a corresponding rotational speed limiting operating mode, that can be selected by the operator.

If the load on the other hand is again reduced starting from the rotational speed of the maximum deliverable load of the internal combustion engine or a local minimum of the specific fuel consumption, this rotational speed is initially maintained, until the power output has been reduced to a third value of the power output. With further increasing load the rotational speed is continuously increased, in particular linearly until a fourth value of the power output is reached, at which the maximum rotational speed is also reached. If then the load decreases even more, the maximum rotational speed is maintained. Preferably the third value of the power output is lower than the second value of the power output and the fourth value of the power output is lower than the first value of the power output. Accordingly, a hysteresis function is used in the rotational speed control that controls higher rotational speed with increasing load compared to reducing loads. Thereby an orderly function is assured for example of a conveying arrangement of a forage harvester arranged downstream of a chopper drum.

In addition, the maximum rotational speed of the internal combustion engine is selected if a discharge arrangement of a forage harvester is in a position directed towards the rear. Thereby the result is a large ejection distance in this situation of the harvesting operation which is required to reach beyond the tractor following the harvesting machine to the trailer towed by the tractor, without requiring an adjustable gearbox driving the conveying arrangement or an adjustable distance between the blower of the conveyor arrangement and an adjacent wall.

The control arrangement preferably raises the rotational speed of the internal combustion engine at harvested crop throughput values below a certain threshold value above a value of the rotational speed that corresponds to a maximum power output or minimum specific fuel consumption, in order to attain an orderly conveying away of the harvested crop.

According to a second aspect of the invention, that may be provided as an alternative or in additional embodiment, this includes a harvesting machine that may be a self-propelled combine, forage harvester, cotton picker or a self-propelled mowing machine, an internal combustion engine and an electronic control arrangement that is coupled to the internal combustion engine and can provide the rotational speed of the internal combustion engine as input. The control arrangement is provided with information showing whether the harvesting machine is in operation on public roads or in harvesting operation. In the harvesting operation an efficient mode can be selected, in which the control arrangement controls the forward propulsion velocity of the harvesting machine and the rotational speed of the internal combustion engine in such a way that the internal combustion engine is operated with respect to power output and rotational speed that corresponds to a local minimum of the specific fuel consumption of the internal combustion engine. Accordingly this takes advantage of the fact that the family of characteristics of the internal combustion engine provides that the internal combustion engine is operated as a rule in the vicinity of the maximum rotational speed or at a rotational speed corresponding to the maximum power output, but located below the maximum power output and is operated at a local minimum of the specific fuel consumption. In this way, the fuel consumption of harvesting machine is optimized.

When the control arrangement controls the forward propulsion velocity of the harvesting machine a solution is to give the operator the opportunity to override the forward propulsion velocity. Accordingly the invention proposes that the control arrangement be connected to a sensor for the detection of the position of the forward propulsion velocity input arrangement that can be controlled by the operator that may be in particular in the form of a speed control lever or a gas pedal. The control arrangement then transmits a velocity signal to the vehicle drive that corresponds to the lower of the input velocities determined by the velocity input arrangement or the velocity determined by the control arrangement.

The harvesting machine may be provided with a single internal combustion engine or two or more internal combustion engines, whose crankshafts can be coupled to each other for corresponding power demands, so that they both operate at the same rotational speed. Preferably the control arrangement uses in each case, the same operating points on the performance map in the case of identical internal combustion engines, that is, they are both operated at the same power output, particularly in the case of internal combustion engines of the standard Euro 4, or one of the internal combustion engines is operated at almost the maximum power output, while the second internal combustion engine is operated at the power level that corresponds to the immediate power demand, that may be useful for internal combustion engines of the standard Euro 3. In the case that internal combustion engines with differing power outputs are combined with each other, the most efficient fuel consumption combination of the operating points from the performance map is used as a target.

BRIEF DESCRIPTION OF THE DRAWINGS

An embodiment of the invention is explained on the basis of the accompanying drawings wherein.

DESCRIPTION OF THE PREFERRED EMBODIMENT

Figure 1:
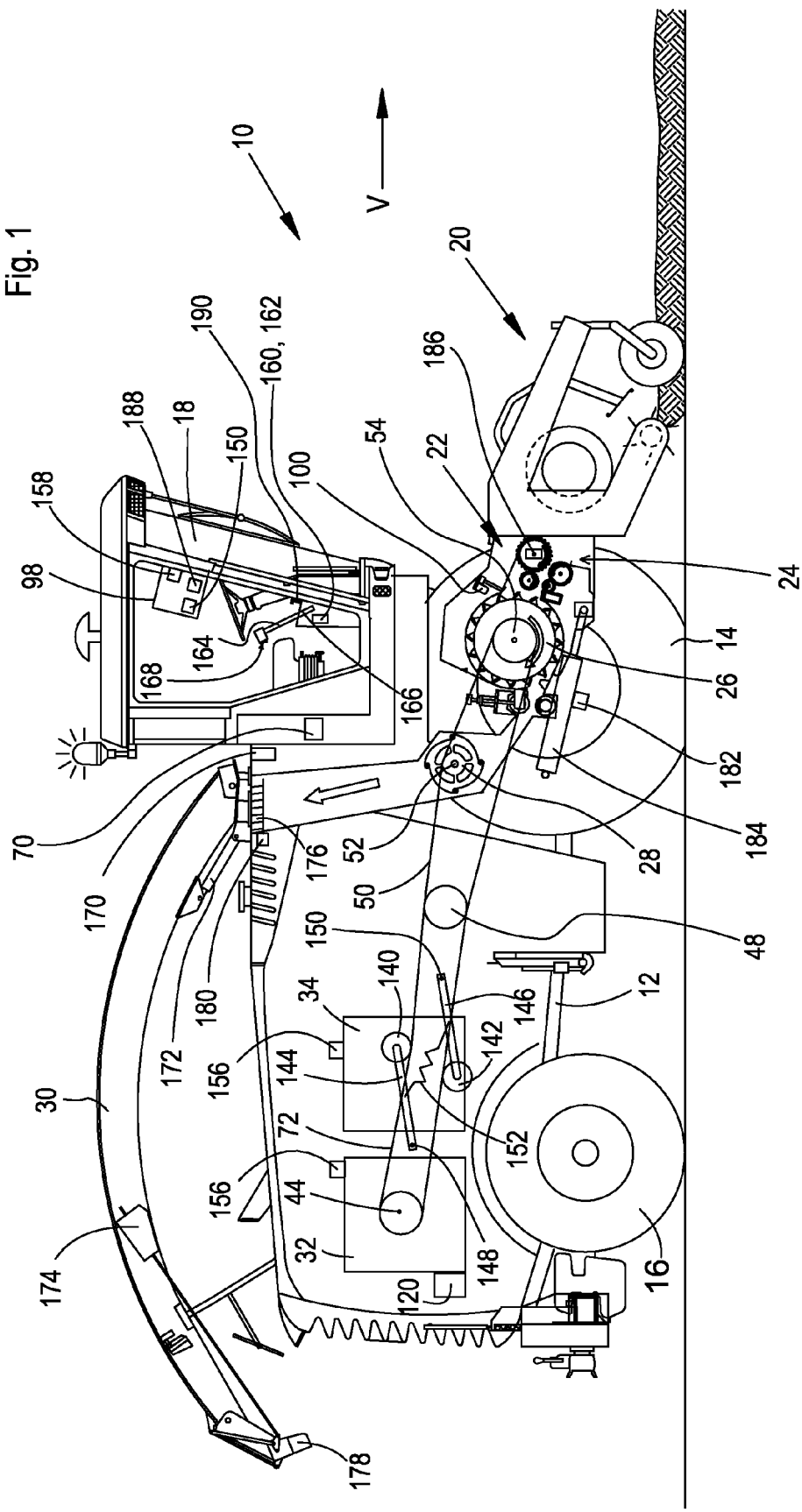
FIG. 1 is a schematic side view of a self-propelled harvesting machine in the form of a forage harvester.

FIG. 1 shows a schematic side view of the harvesting machine 10 in the form of a forage harvester. The harvesting machine 10 is supported on a frame 12 that is carried by front driven wheels 14 and rear steerable wheels 16. The harvesting machine 10 is controlled from an operator's cab 18, from which a front harvesting attachment 20 in the form of a take-up can be controlled visually. It will be recognized that the attachment also be replaced by a front mowing attachment for the harvest of corn. Harvested crop taken up from the ground by means of the front harvesting attachment 20, for example, grass or the like, is conducted over an intake conveyor 22 with rough pressing rolls, arranged within an intake housing 24 at the front side of the forage harvester 10, to a chopper arrangement 26 in the form of a chopper drum located underneath the operator's cab 18. The chopper arrangement chops the crop into small pieces and delivers it to a conveyor arrangement 28. Accordingly the chopper arrangement 26 and the conveyor arrangement 28 are operating elements for the conveying or processing of harvested crop. The crop leaves the harvesting machine 10 to an accompanying transport vehicle over an output arrangement 30 in the form of an output elbow that can be rotated about an approximately vertical axis and adjusted in its inclination. In the following the designations such as to the side, downward and upward refer to the forward operating direction V of the harvesting machine 10 that extends to the right in FIG. 1.

Drive Arrangement

Figure 2:
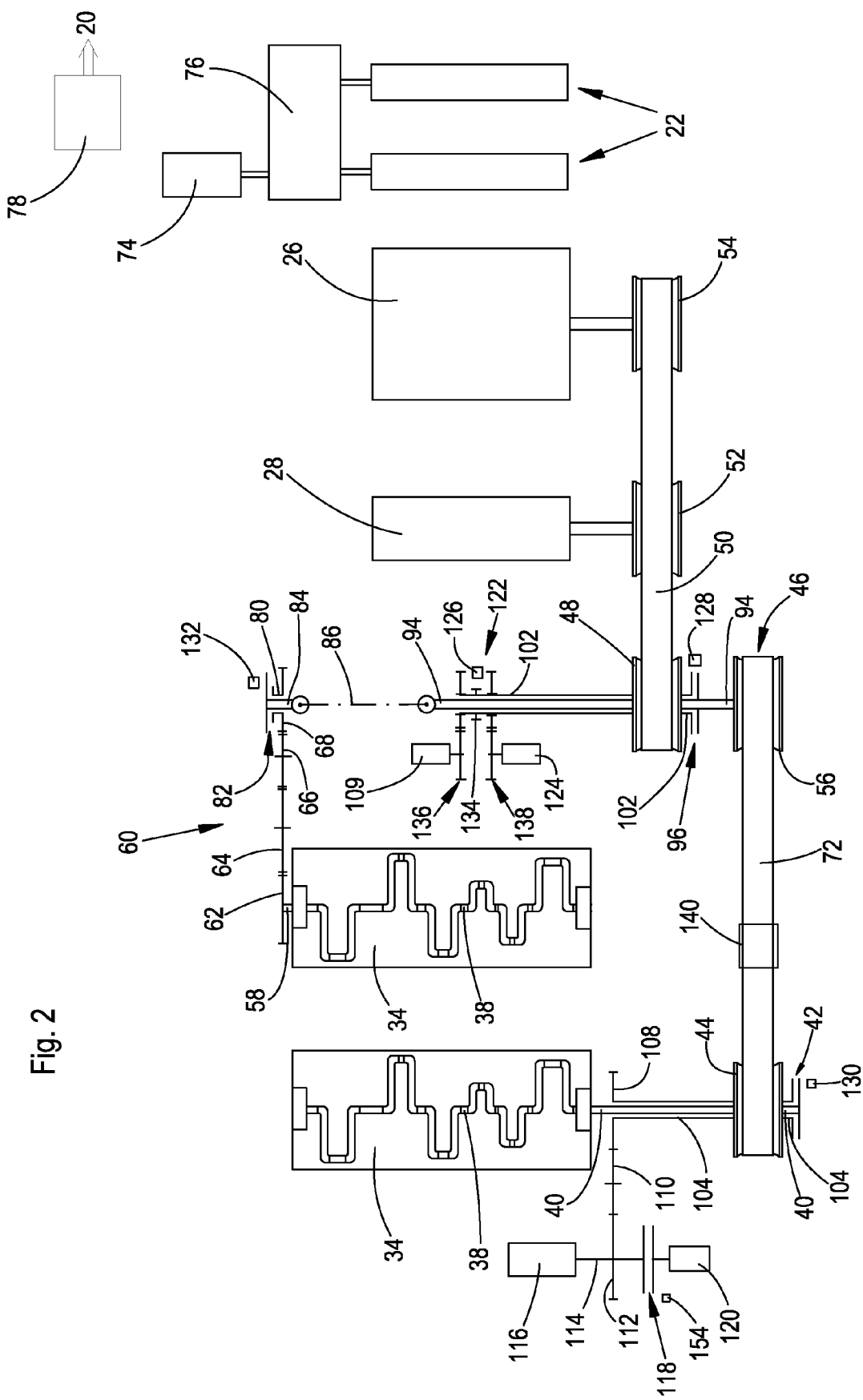
FIG. 2 is a schematic plan view of the drive system of the harvesting machine of FIG. 1.

FIG. 2 shows a plan view of the drive arrangement of the harvesting machine 10. In the rear regions of the harvesting machine 10 two internal combustion engines 32, 34 are located that are connected separately from each other to longitudinal carriers and/or transverse carriers of the frame 12. The internal combustion engines 32, 34 are preferably configured as diesel engines and generally include separate oil and cooling circuits as well as starters. Their power output capacity is preferably equal, although it could be different. The rear, first internal combustion engine 32 and its (first) crankshaft 36 extend transverse to the forward operating direction V of the harvesting machine 10. The front, second internal combustion engine 34 and its (second) crankshaft 38 also extend transverse to the forward operating direction V of the harvesting machine 10, but are rotated 180 degrees about the vertical axis relative to the first internal combustion engine 32.

The first crankshaft 36 is connected to an output shaft 40 that is coupled for its part to the input side of a first clutch 42. The output side of the first clutch 42 is connected rigidly over a hollow shaft 104 to the input pulley 44 of a first belt drive 46, whose output pulley 56 is coupled rigidly to a coaxial transverse shaft 94. The first drive belt 72 extends around the input pulley 44 and the output pulley 56 of the first belt drive 46. The first clutch 42, the input pulley 44 and the output shaft 40 are arranged coaxially to each other and their axes extend horizontally and transverse to the forward operating direction. Accordingly, the first belt drive 46 extends from the first internal combustion engine 32 forward to the transverse shaft 94. The first clutch 42 is located away from drive pulley 44 on the side away from the longitudinal center plane of the harvesting machine 10.

The output shaft 58 of the second internal combustion engine 34 is connected with a hollow shaft 80 over a spur gear gearbox 60 containing a total of four gears 62 through 68, whose axis of rotation extend horizontally and transverse to the forward operating direction V. The inlet side of the second clutch 82 is located at outer side of the hollow shaft 80. The spur gear gearbox 60 could also be replaced by a second belt drive (not shown), that provides a drive connection between the output shaft 58 and the hollow shaft 80 or the input side of the second clutch 82. The output side of the second clutch 82 is connected to a shaft 84 extending horizontally and transverse to the forward operating direction V that extends through the hollow shaft 80 and is connected to the input side of an articulated shaft 86, that also extends horizontally and transverse to the forward operating direction V. The articulated shaft 86, in turn, is connected at its output side with the transverse shaft 94.

The transverse shaft 94 is rigidly connected to the input side of the third clutch 96 on the side of the output pulley 56 adjacent to the longitudinal center plane of the harvesting machine 10, the output side of the third clutch 96 is coupled to a further hollow shaft 102, that encloses the transverse shaft 94 and extends coaxially thereto. The transverse shaft 94 is coupled rigidly, fixed against rotation, to a belt pulley 48 on the side of the third clutch 96 adjacent to the longitudinal center plane of the harvesting machine 10. The belt pulley 48 is encircled by a second drive belt 50 that is also looped around a belt pulley 52 for the drive of the conveying arrangement 28 and a belt pulley 54 for the drive of the chopper arrangement 26. The second drive belt 50 can be tensioned by an associated tensioning pulley (not shown) in its returning upper span between the belt pulleys 48 and 52. The drive of a kernel processing arrangement 104 arranged between the chopper arrangement 26 and the conveying arrangement 28 is preferably performed by means of a further belt drive (not shown) from the shaft 106 of the belt pulley 52.

The hollow shaft 104 also extends on the side of the drive pulley 44 facing the longitudinal center plane of the harvesting machine 10 and there carries a gear with teeth 108 on its circumference, that meshes with a further gear 110, which drives over a third gear 112 a shaft 114 arranged in the transverse direction, a pump assembly 116, that is used to supply the hydraulic motors driving the wheels 14, 16. The shaft 114 is also connected so as to drive by means of a fourth clutch 118, a pump 120 for the hydraulic supply of a hydraulic motor 78 for the drive of the front harvesting attachment 20.

The hollow shaft 102 is connected, so as to drive over a shift gearbox 122 selectively with the reversible motor 109 or a hydraulic pump 124 preferably with adjustable stroke volume. The shift gearbox 122 is connected by means of an actuator 126, actuated by external forces, that can be operated particularly hydraulically, pneumatically or electromagnetically, to a control arrangement 70, that also controls an actuator 128 for the actuation of a third clutch 96, an actuator 130 for the actuation of the first clutch 42, and an actuator 132 for the actuation of the second clutch 86. The hydraulic pump 124 is connected so as to conduct hydraulic fluid to a hydraulic motor 74 that is provided with a fixed or adjustable stroke volume and drives the rough pressing rolls of the intake conveyor 22 by means of a gearbox 76. The shift gearbox 122 includes a sleeve 134 connected to the hollow shaft 102 fixed against rotation, but the sleeve can be slid axially along the hollow shaft 102 by means of the actuator 126, the sleeve can be brought into engagement by the actuator 126 selectively with a pair of gears 136 so as to drive the reversible motor 109 or connected to a pair of gears 138 for the drive of the hydraulic pump 124.

The drive ratios of the first belt drive 46 and the spur gear gearbox 60 are preferably identical, in order to attain equal rotational speed for the two internal combustion engines 32, 34. They can be operated at equal rotational speeds, or also at a speed ratio differing from 1:1 in order to attain a desired rotational speed at the drive pulley 48 and the chopper arrangement 26 and the conveyor arrangement 28.

Since the first belt drive 46 must transport the power output not from front to back when the first internal combustion engine 32 is stopped, but in the opposite direction from the source 94 to the pump assembly 116, then the lower span or the upper span of the first drive belt 72 can be used to transmit power, while then the other span in each case operates as an idle span. In order to account for this fact, the first belt drive 46 is associated with two tensioning pulleys 140, 142 that are fastened to separate retaining arrangements 144, 146, that extend pivoting freely about axes 148, 150 extending horizontally and transverse to the forward operating direction. The retaining arrangements 144, 146 are preloaded against each other by the force of a spring 152 and/or a hydraulic cylinder (not shown). In each case, the axes 148 and 150 are located ahead of the tensioning pulleys 140 and 142 relative to the direction of operation of the drive belt. It will be seen then that the arrangement with two tensioning pulleys 140 and 142 can also be used by drive systems, in which the second internal combustion engine 34 does not drive the belt pulley 48 by means of an articulated shaft but in any desirable other way (for example, by means of a pure gear drive gearbox or a second belt drive, etc.)

Method of Operation of the Drive Arrangement

The method of operation of the drive system shown in FIGS. 1 and 2 is such that the operator can inform the control arrangement 70 by means of an operator's input arrangement 98 located in the operator's cab 70 whether one or both of the internal combustion engines 32, 34 are required. This selection can also be performed during the harvesting operation on the basis of: 1) the measurement of the power output, by means of a torque sensor within the driveline of the chopper arrangement 26; 2) information regarding the power delivered at any one time by the internal combustion engines 32, 34; 3) the type of front harvesting attachment 20 detected; or 4) the harvested crop throughput is measured. At a sufficiently low demand for power, that is less than the nominal power output of one of the internal combustion engines 32, 34 only one internal combustion engines 32 or 34 is put into operation while the other engine is stopped. Thereby the internal combustion engine is preferably selected automatically which has consumed the lower amount of fuel or that exhibits the lower degree of contamination in the engine oil, as determined by means of an appropriate sensor (see DE 102 25 716 A1). The selection of the internal combustion engine can also be performed on the basis of the criteria mentioned by DE 10 2006 004 143 A1. If the power output capacity of the two internal combustion engines 32, 34 differs, then the power output to be delivered by the internal combustion engines 32 or 34 is also to be considered, so that in the case of a power output demand that is greater than the power output capacity of the weaker internal combustion engine 32 or 34 and below the power output capacity of the stronger internal combustion engine 34 or 32, then the stronger internal combustion engine 34 or 32 is selected. Moreover, during operation on public roads that can be selected by means of corresponding inputs by a switch 158 of the input arrangement 98 in the control arrangement 70, automatically only a single internal combustion engine 32 or 34 is brought into operation.

If the first internal combustion engine 32 is to be brought into operation, the control arrangement 70 induces the actuator 130 to engage the first clutch 42 and induces the actuator 132 to disengage the second clutch 82. Accordingly, the first internal combustion engine 32 drives the transverse shaft 94 over the first belt drive 46, so that the articulated shaft 86 also rotates along with these.

If analogously, only the second internal combustion engine 34 is to be put into operation, then the control arrangement 70 induces the actuator 130 to disengage the first clutch 42 and the actuator 132 to engage the second clutch 82. Accordingly the second internal combustion engine 34 drives the transverse shaft 94 over the articulated shaft 86. The first belt drive 46 then runs along freely.

In operation on public roads the control arrangement 70 induces the actuator 128 to disengage the third clutch 96 and the actuator 154 to disengage the clutch 118. Accordingly, in operation on public roads neither the belt pulley 48 with the drive belt 50, nor the hollow shaft 102 nor the pump 120 is driven. However, the first belt drive 46, the articulated shaft 86 and the pump assembly 116 are driven, so that all the elements required for operation on public roads are driven, while the elements required for the harvesting operation are stopped.

During the harvesting operation, the control arrangement 70 induces the actuator 128 to engage the third clutch 96 and the clutch 118, when the switch 98 is in the position for the harvesting operation and a further switch 188 which is used as operating switch for the harvested crop take-up arrangement and harvested crop processing elements are turned on, so that then the pump 120 and therewith the hydraulic motor 78 for the drive of the front harvesting attachment 20, the belt pulley 48 and with it the conveying arrangement 28 and the chopper arrangement 26 and the hollow shaft 102 are brought into operation. During the normal harvesting operation the control arrangement 70 induces the actuator 126 to bring the shift gearbox 122 into a position in which the hydraulic pump 124 and with it the hydraulic motor 74 for the drive of the intake conveyor 22 are driven. In case of a jam of the harvested crop the hydraulic motor 74 can be reversed in that its swash plate is repositioned accordingly. In order to grind the knives of the chopper arrangement 26 in a backward rotation of the grinding arrangement 100, the control arrangement 70 can bring the shift gearbox 122 into a position in which the reversible motor 109 with the hollow shaft 102 is connected, so as to drive, and drives the latter in the opposite direction to the normal operation when the third clutch 96 is disengaged.

In case the first combustion engine 32 is running and now the second internal combustion engine 34 is also needed, the control arrangement 70 induces the latter to be started, and brought to the rotational speed 156 of the first internal combustion engine 32 and to engage the second clutch 82. On the other hand in case only the second internal combustion engine 34 is running and now the first internal combustion engine 32 is also needed, the control arrangement 70 induces the latter to be started by a starter and brought up to the rotational speed of the second internal combustion engine 34 by its engine control arrangement 156 and the first clutch 42 is engaged. Analogously in case the power requirement is lowered the control arrangement 70 induces the first or the second internal combustion engine 32 or 34 to be stopped on the basis of the aforementioned criteria in that the first clutch 42 is induced by the actuator 130 or the second clutch 82 is induced by the actuator 132 to disengage, and immediately following the engine control arrangement 156 of the internal combustion engines 32 or 34 to be stopped and to cut off the fuel supply.

Rotational Speed Input for the Internal Combustion Engine

The control arrangement 70 is used furthermore for the input of the rotational speed of the internal combustion engines 32, 34 in operation on public roads and in the harvesting operation. For this purpose the control arrangement 70 is connected to a sensor 160 for the detection of the position of a velocity input arrangement 164 in the form of a drive control lever, that is arranged within the operator's cab 18 and that can rotate about an axis of rotation 166 extending horizontally and transverse to the forward operating direction V and is used by the operator for the input of the forward operating velocity of the harvesting machine 10. The velocity input arrangement 164 is moved from a neutral position to the front, when the harvesting machine 10 is to operate in the forward operating direction, and is moved from the neutral position to the rear when the harvesting machine 10 is to operate in reverse. A sensor 162 is connected to the control arrangement 70 and detects whether the velocity input arrangement is in the neutral position, in which the harvesting machine is stopped.

At the upper end of the velocity input arrangement 164, a keyboard 168 that can be actuated by the operator is located on the surface facing the operator, with which actuators 170, 172, 174 can be actuated, that are used for the positioning of the discharge arrangement 30, where the actuator 170 rotates the discharge arrangement 30 about a slewing ring 176 about the vertical axis, the actuator 172 rotates the discharge arrangement 30 relative to the slewing ring 176 about a horizontal axis and thereby varies the height of the discharge end and the actuator 174 readjusts an outlet flap 178. The position of the discharge arrangement 30 about the vertical axis that can be changed by the actuator 170 is detected by means of a sensor 180; this may be a potentiometer or a coding disk with a light barrier. The sensor 180 is connected with the control arrangement 70.

Moreover, the control arrangement 70 is connected with a sensor 182 that detects the variable height of the front harvesting attachment 20 above the ground that can be changed by means of a hydraulic cylinder 184 (or the position of the hydraulic cylinder 184 that is a measure of the height of the front harvesting attachment above the ground). The control arrangement 70 is connected with a further sensor 186 that detects the rotational speed of the pre-pressing rolls of the intake conveyor 22. The control arrangement 70 is also supplied with a forward operating velocity signal that may originate from an appropriate sensor, that detects the rotational speed of a wheel 14 or 16 or the drive-line associated with the wheel 14 or 16 or a radar sensor that interacts with the ground. As noted previously the engine control arrangements 156 of the control arrangement 70 transmit signals regarding the actual power output of the internal combustion engines 32, 34. Since the control arrangement 70 controls the third clutch 96, that may be a main clutch which is only actuated during the harvesting operation, the control arrangement 70 is also provided with information about whether the clutch 94 is engaged or disengaged. The aforementioned connections between the control arrangement 70 and the sensors 160, 162, 180, 182, 186 as well as the clutch 96, the operator input arrangement 98 and the engine controls 156 are preferably performed over a bus in order to keep the cost of wiring within bounds.

Input of the Method of Operation

Figure 3:
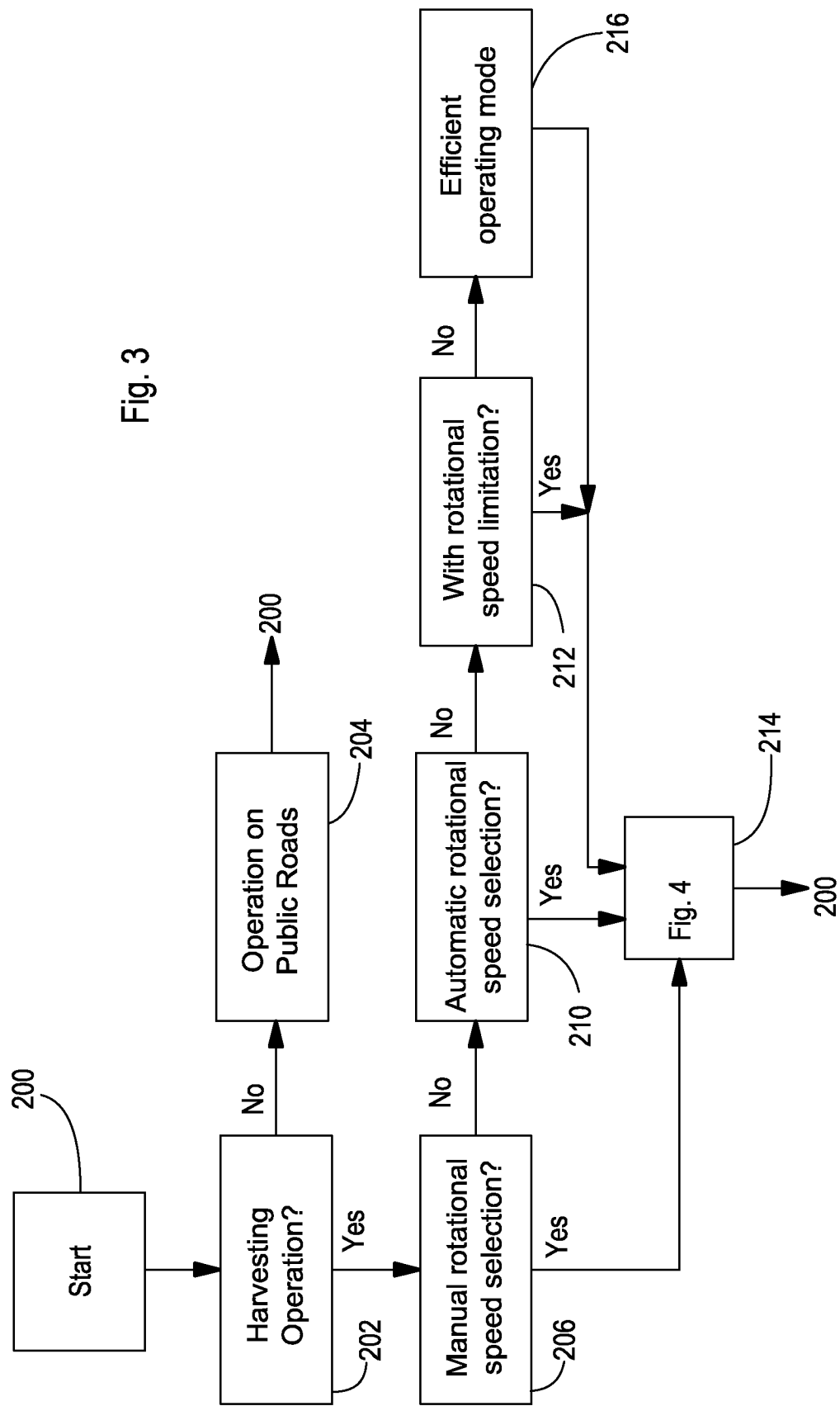
FIG. 3 is a flow chart regarding the selection of the various operating points of the control arrangement.

In the control of the internal combustion engines 32, 34 the control arrangement 70 operates according to the flow chart of FIG. 3. After the start in step 200, in step 202 the operator verifies by means of the switch 158 whether operation on public roads has been selected. If that is the case, the control arrangement selects the particular internal combustion engine 32 or 34 in step 204, as described above, and advises the control arrangement 156 to adjust an appropriate rotational speed. In addition, the pump used for the drive of the hydraulic motors for the wheels 14, 16 in the pump assembly 116 and the hydraulic motor of the wheels 14, 16 are controlled in such a way, that a forward propulsion velocity that can be adjusted by the velocity input arrangement 164 is reached. For this purpose, reference is made to the disclosure of DE 10 2007 058 535 A1. Step 200 again follows step 204.

If step 206 has resulted in the fact that no manual operating form of the rotational speed input has been selected, step 210 follows, in which the question is raised whether the operator has selected an automatic rotational speed control by means of the switch 190. If this is not the case, step 212 follows, in which the question is raised whether the operator has selected an automatic rotational speed with a rotational speed limit by means of the switch 190. If the operator has selected the automatic rotational speed selection in step 210, or that the operator, in step 212, has selected the automatic rotational speed with rotational speed limitation, in both cases, routine 214 follows, which is shown in greater detail in FIG. 4. In case step 212 results in the fact that the operator has not selected the automatic rotational speed with rotational speed limitation, step 216 follows in which the subject is an efficiency mode, which in turn is also followed by routine 214.

Automatic Rotational Speed Adjustment

Figure 4:
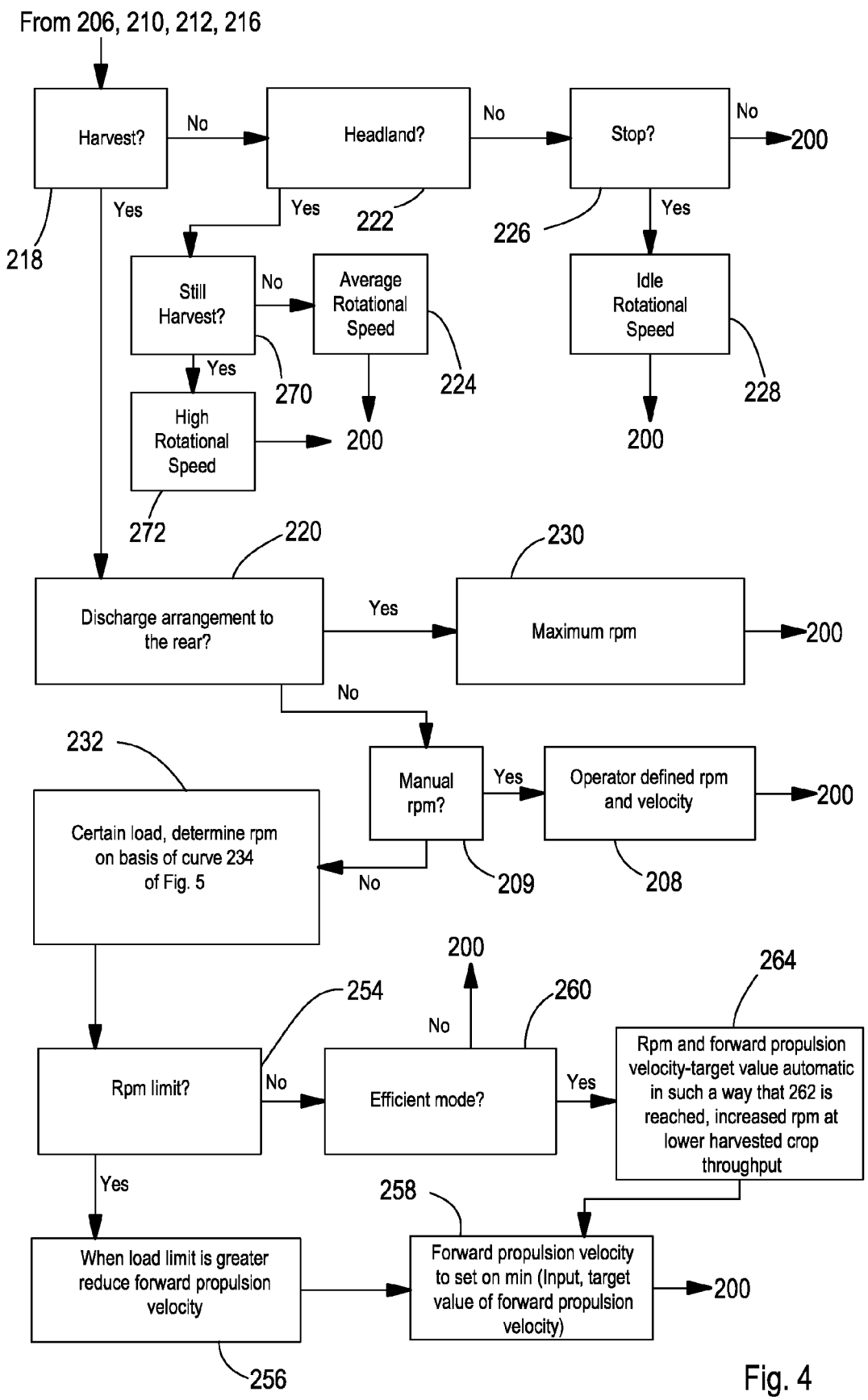
FIG. 4 is a flow chart for the automatic operation of the control arrangement; and, FIG. 5 is a performance map of the internal combustion engines of the harvesting machine and of the characteristic curve used by the control arrangement.

Reference is now made to FIG. 4, on the basis of which and in which routine 214 is explained in greater detail.

Idle Operation or Headland Operation

Starting with the steps 206, 210, 212 or 216, step 218 initially checks whether a harvesting process is just taking place. For this purpose it can individually determine whether the front harvesting attachment 20 is in an inactive lowered position (sensor 182), whether the intake conveyor 22 is active (sensor 186) and whether the velocity input arrangement 164 is out of its neutral position (sensor 162). Only after all three conditions have been satisfied step 220 follows, otherwise step 222 follows, in which the question is raised whether the harvesting machine 10 just happens to be at the headland or in another idling condition, during which no harvested crop is taken up. For this purpose the control unit can determine individually whether the forward propulsion velocity is equal to zero or is below a threshold of for example 1 km/h (at the forward propulsion velocity signal) or if the clutch 96 is engaged (on the basis of the condition of the clutch 96 as controlled by the control arrangement 70). If one or both of these conditions apply, step 270 follows, in which the control unit 70 determines whether harvested crop is still in the harvesting machine 10 or can be there. This can be recognized, for example, by the fact that a certain time interval has elapsed since raising the front harvesting attachment 20 by means of a hydraulic cylinder 184, which is required by the harvested crop to pass through the front harvesting attachment 20 and the harvesting machine 10, and/or appropriate sensors are used to determine whether harvested crop still remains in the harvesting machine, for example by means of knock sensors (see EP 1 344 444 A1) or sensors to determine the spacing between the pre-pressing rolls (compare DE 199 03 471 C1) or an appropriate camera with an image processing system. If step 270 determines that no harvested crop remains, step 224 follows, in which the control arrangement 70 induces the engine control 156 of the particular active internal combustion engine 32 and/or 34 to adjust an average rotational speed for the internal combustion engines 32 and/or 34, that lies between an idle rotational speed of the internal combustion engines 32, 34 and its maximum rotational speed, for example, at approximately 1200 rpm. The rotational speed selected in step 224 may be a fixed, predetermined value or it can vary between certain limits and is a function of the actual load of the internal combustion engines 32 and/or 34, which in turn is provided primarily as a function of the power requirements for the forward propulsion drive of the harvesting machine that is a function of the shape of the terrain. In fact, the rotational speed selected in step 224 may be constant at a power output of between 0 and a first value (for example, 100 kW) and may lie between 900 and 1500 rpm. If the power requirement exceeds the first value, then the rotational speed as well as the power output increases linearly, where the rate of increase can increase still further in the upper rotational speed range. For this, reference can be made to the curve 268 in the diagram of FIG. 5 that reproduces a possible example for a variable rotational speed of the internal combustion engines 32 and/or 34. Step 224 again is followed by step 200. In case step 270 has resulted in the fact that harvested crop can still remain in the harvesting machine 10, then step 272 follows, in which a relative high rotation speed is selected for the internal combustion engines 32 and/or 34, which is sufficient for the conveying away of the harvested crop in the harvesting machine 10, particularly in regard to the conveying arrangement 28. This avoids the problem that the conveying arrangement 28 or the discharge arrangement 30 following it jams relatively low harvested crop throughput at the end of the field.

Stoppage of the Harvesting Machine

If step 222 results in the fact that the harvesting machine 10 is not maneuvering ahead of the turn at the end of the field or is operating at idle speed, step 226 follows, which determines if the harvesting machine is stopped. For this purpose the question can be raised in actual fact whether the velocity input arrangement 164 is in its neutral position (sensor 162) and whether the forward propulsion velocity is equal to zero or is below a threshold value of for example 1 km per hour (on the basis of the forward velocity signal). If both conditions are fulfilled simultaneously, step 228 follows, otherwise step 200. In step 228 the control arrangement 70 induces the engine control 156 of the particular active internal combustion engine 32 and/or 34, to adjust the idle rotational speed that may be approximately 900 rpm. At this point the internal combustion engines 32 and/or 34 may be stopped if the harvesting machine 10 has not moved for a longer time interval (for example, 1 minute). Step 200 again follows.

Rotational Speed with Discharge Arrangement Directed to the Rear

Initially, in step 220 a check will be made on the basis of the sensor 180 whether the discharge arrangement 30 is directed toward the rear, that is that the harvested crop is to be thrown beyond a towing vehicle in the form of a tractor, a towing machine or a truck over a relative large distance to a self-loading forage container. Here an angle of +/−20 degrees is considered as the equivalent of the exact direction to the rear of the discharge arrangement 30. If that is the case, step 230 follows, in which the maximum rotational speed of the internal combustion engine 32 and/or 34 is operated. The result then is that the conveying arrangement 28 is driven at its maximum rotational speed, in order to attain the required throwing distance. Step 230 is again followed by step 200. It should be noted that step 230 follows only if no repositioning of the actuator 170 is performed by means of the keyboard 168 for a certain time interval, for example at least 1 second. This will prevent the maximum rotational speed of the internal combustion engine 32 and/or 34 from being selected if the operator brings the discharge arrangement 30 from one side of the harvesting machine 10 to the other, for example, at the end of the field. If the discharge arrangement is located in the aforementioned angular range, in which it is seen essentially as directed to the rear, and if it is then rotated out of this angular range, then the maximum rotational speed is maintained over a larger angular range that may amount to an additional +/−10 degrees that is an addition to the aforementioned angular range. If the discharge arrangement 30 approaches the larger angular range from the side of the harvesting machine 10, the original rotational speed is maintained initially, until the discharge arrangement 30 penetrates into the aforementioned smaller angular range then the maximum rotational speed is selected according to step 230. This hysteresis prevents an undesirable jump in the rotational speed.

Manual Rotational Speed Input

In case that step 220 results in the fact that the discharge arrangement 30 is not directed to the rear, step 209 follows, in which the question is posed, whether a manual rotational speed input was selected in step 206. If that is the case, step 208 follows, in which the operator can provide as input the desired rotational speed of the internal combustion engines 32 and/or 34 over an appropriate menu or a rotary knob (not shown) on the operator input arrangement 98 or a rotary knob 190 arranged in the vicinity of the velocity input arrangement 164. The forward propulsion velocity is provided as input by the velocity input arrangement 164, as is the case in the operation on public roads, and the pump in the pump assembly 116 used for the drive of the hydraulic motors for the wheels 14, 16, of the wheels 14, 16 are controlled in such a way that a forward propulsion velocity that can be adjusted with the velocity input arrangement 164 is reached. Step 200 again follows step 208.

Automatic Rotational Speed Input

In case step 209 results in the fact that the manual rotational speed input arrangement was not selected, then step 232 follows. There the load on the internal combustion engine 32 and/or 34 is determined and the rotational speed is selected on the basis of the curve 234 shown in FIG. 5.

Figure 5:
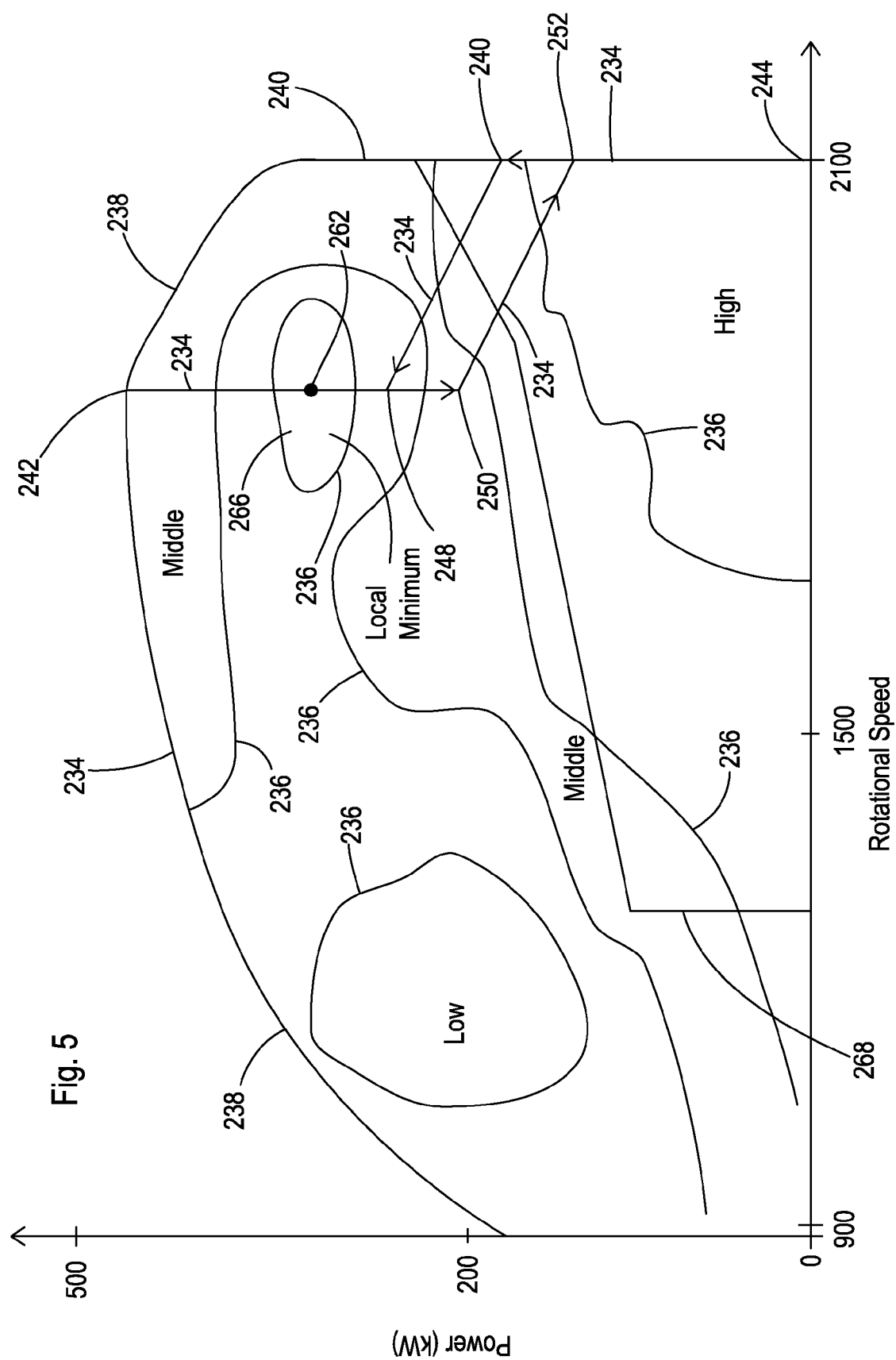

FIG. 5 shows the performance map of the internal combustion engines 32 and 34; the rotational speed is shown on the x-axis and the power output is shown on the y-axis. The individual curves 236 in each case show points with the same specific fuel consumption that can be measured in gm/kWh. It is characterized by the legends that in the lower right hand corner a relatively high specific fuel consumption exists at high rotational speeds and low power output, while the specific fuel consumption in the upper left, that is at low rotational speed and average power output, is relatively low. The performance map is bordered in the upward direction by an upper limiting curve 238 that is provided as input by the power output capacity of the internal combustion engines 32 and/or 34. Towards the right the performance map at 240 is limited by the rotational speed of the internal combustion engines 32 and/or 34. The upper limit curve 238 has an absolute maximum of 242 below the maximum rotational speed of 240 of approximately 1900/rpm that corresponds to the maximum power output that can be developed by the internal combustion engine 32 and/or 34. There is a local minimum 266 in the specific fuel consumption that lays below (a little more than 10%) a maximum rotational speed 242 and a power output The lowest rotational speed shown corresponds to idle rotational speed.

This will now begin from the fact that the harvesting machine 10 has initially not yet taken up any harvested crop, so that information exists in the control arrangement 70 from the engine control arrangement 156 that the load of the combustion engines 32 and/or 34 is relatively small. Accordingly, the control arrangement 70 selects the maximum rotational speed on the basis of the curve 234 of FIG. 5 (point 244). If immediately following the load increases since harvested crop is being taken up, then the control arrangement 70 maintains the maximum rotational speed according to the curve 234, until a first load 246 has been reached. If then the load and the power output increases further, the rotational speed is reduced linearly with increasing load, until a second power level 248 at which the rotational speed is reached, that also corresponds to the maximum 242 and at which the local minimum (fuel consumption) 166 is located. As the load increases further the rotational speed remains constant according to the curve 234, up to the maximum 242. If the load is again lowered at this rotational speed, the control arrangement 70 also holds the rotational speed as constant, until a third power output level 250 is reached. If the load then is reduced further then the control arrangement 70 increases the rotational speed linearly until the maximum is again reached at a fourth power level 252. The third power level is lower than the second power level. The fourth power level is also lower than the first power level. Accordingly, a hysteresis is followed, that here prefers a higher rotational speed of the internal combustion engine with increased harvested crop throughput resulting in a better conveying by the conveying arrangement 28.

In step 254 that follows step 232 the question is posed whether an automatic rotational speed limit has been selected in step 210 or 212. If that is not the case, then step 254 is followed by step 260. If now the power output and the rotational speed is at the maximum point 242 and the load increases further, the rotational speed of the internal combustion engine will necessarily drop off on the basis of the curve 234 that follows the upper limit curve 238 from the maximum 242 to the left.

On the other hand, step 254 is followed by step 256, in which it is ascertained whether the load of the internal combustion engine 32 and/or 34 is so large that it is already operating along the limit curve 238. If that is the case, the control arrangement 70 determines the target value of the forward propulsion velocity, at which the internal combustion engine 32 and/or 34 operates at the maximum 242. In the following step 258 the control arrangement 70 adjusts an actual forward propulsion velocity that corresponds to the lower value (minimum) of the velocity defined by the velocity input arrangement 164 and the target value of the forward propulsion velocity determined by the control arrangement 70 in step 256. In the operating mode of the automatic rotational speed selection with a rotational speed limit the operator, accordingly, can set the velocity input arrangement 164 to the highest velocity setting and the control arrangement 70 holds the internal combustion engine 32 and/or 34 to a maximum 242 by corresponding selection of the forward propulsion velocity. Step 200 again follows.

In case during the transition from step 258 to step 200 the power output and the rotational speed is at the maximum 242 and the load increases further, then the rotational speed of the internal combustion engine will necessarily drop off on the basis of the curve 234, that follows the upper limit curve 238 from the maximum 242 to the left.

In case that step 254 results in the fact that no rotational speed limits were selected, step 260 follows, in which the question is posed whether the efficient mode had been selected. If that is not the case, step 200 follows, otherwise step 264 follows in which the control arrangement 70 advises the engine control arrangement 156 of the internal combustion engine 32 and/or 34, to adjust a rotational speed that corresponds to the point 262, that is located in turn in a local minimum 266 of the specific fuel consumption of the performance map of FIG. 5 and is located at the maximum 242. In addition the control arrangement 70 calculates a velocity target value, at which a load of the internal combustion engine 32 and/or 34 corresponding to point 262 is reached. In step 258 immediately following, the control arrangement 70 adjusts an actual forward propulsion velocity that corresponds to the lower (minimum) value of the velocity provided by the velocity input arrangement 164 and the forward propulsion velocity target value determined by the control arrangement 70 in step 260. In the operating mode of the most efficient operation, the operator accordingly can set the velocity input arrangement 164 to the highest velocity and the control arrangement 70 holds the internal combustion engine 32 and/or 34 at all times to point 262 by means of a corresponding choice of the forward propulsion velocity at the local minimum of the specific fuel consumption, so that a fuel saving operation is made possible, which saves several percent of fuel consumption as against the method of operation of the automatic rotational speed selection.

It should be noted that in step 264 at relatively low harvested crop throughputs below a certain harvested crop throughput (analogous to steps 270, 272) a relatively high rotational speed for the combustion engine 32 and/or 34 can be selected, that is higher than the rotational speed of the local minimum 266 and the maximum power output 242, in order to attain an assured discharge of the harvested crop particularly by means of the conveying arrangement 28 and the discharge arrangement 30. Here for example, the operating point of the internal combustion engine 32, 34 can be shifted horizontally to the right from the point 262 in the diagram according to FIG. 5, or the hysteresis with points 240, 248, 250, and 252 and the lines 234 are shifted upward at the low harvested crop throughputs as previously noted. To determine the harvested crop throughput, that can be detected, for example, by the spacing between the pre-pressing rolls of the intake conveyor 22 or looking ahead, by means of a camera or a scanner to scan the matter located in the harvesting machine 10. Alternatively or in addition the need of drive power for the forward propulsion drive and other elements not required for the harvested crop processing (for example, air conditioning, engine cooling, etc.) can be measured, in order to establish the harvested crop throughput, the power requirement of the harvested crop processing power is used to determine the harvested crop throughput by subtracting the drive power from the power output of the internal combustion engine 32 and/or 34. Step 200 again follows.

In the adjusting and control processes described above multiple changes in the rotational speed of the internal combustion engines 32, 34 are performed. These changes should on the one hand occur as rapidly as possible in order to attain the desired result as rapidly as possible. On the other hand, excessively rapid changes in the rotational speed may have undesirable wear results of the belts 50 and 72. Accordingly, the rate of change in the rotational speed can be provided as a fixed input, or it can be adjusted by the operator by means of the operator input arrangement 98.

If only a single internal combustion engine 32 or 34 is required, the control arrangement 70 proceeds in the aforementioned manner. If both internal combustion engines 32 and 34 are in operation, both are controlled on the basis of the curve 234 of FIG. 5, in case they are identical, that is they have the identical nominal power output. If internal combustion engines 32, 34 of differing power outputs are used, associated curves are used for each according to FIG. 5, where the rotational speeds of both internal combustion engines are equal and they are operated in the operating type of the most efficient operating mode in this local minima of the specific fuel consumption or in the most efficient combination of the operating points from the performance maps.

Having described the preferred embodiment, it will become apparent that various modifications can be made without departing from the scope of the invention as defined in the accompanying claims.

The invention claimed is:

1. A self-propelled harvesting machine, having an internal combustion engine, an electronic control arrangement coupled to the internal combustion engine and providing as input the rotational speed of the internal combustion engine, and being provided with information about whether the harvesting machine is in operation on public roads or in a harvesting operation, wherein the control arrangement is operated during the harvesting operation so as to provide as input in an automatic operating mode the rotational speed of the internal combustion engine as a function of an operating situation of the harvesting machine automatically recognized by the control arrangement wherein during a stop of the harvesting machine the control arrangement is operated so as to bring the rotational speed of the internal combustion engine to one of an idle rotational speed and stop.

2. A self-propelled harvesting machine according to claim 1, wherein the control arrangement is operated so as to recognize the situation of the harvesting operation on the basis of one of: operator input; and adjusting magnitudes influenced by an operator's input, that are used for the control of the forward propulsion drive, and the harvesting operation of the harvesting machine.

3. A self-propelled harvesting machine according to claim 1, wherein the control arrangement is connected with a switch with which an operator can switch from an operation on public roads to a harvesting operation and is operated so as to recognize the harvesting operation on the basis of the position of the switch.

4. A self-propelled harvesting machine, having an internal combustion engine, an electronic control arrangement coupled to the internal combustion engine and providing as input the rotational speed of the internal combustion engine, and being provided with information about whether the harvesting machine is in operation on public roads or in a harvesting operation, wherein the control arrangement is operated during the harvesting operation so as to provide as input in an automatic operating mode the rotational speed of the internal combustion engine as a function of an operating situation of the harvesting machine automatically recognized by the control arrangement, wherein a situation of the harvesting operation recognized by the control arrangement is one of an idle operation without taking up any harvested crop, and a headland operation at an end of a field, that is recognized on the basis of at least one of a position of a front harvesting attachment and the type of operation of an intake conveyor and the forward propulsion velocity, and the control arrangement is during the idle operation to bring the rotational speed of the internal combustion engine to one of a constant rotational speed and an idle rotational speed, that is between an idle rotational speed and a maximum, as long as no harvested crop is located in the harvesting machine while the rotational speed of the internal combustion engine is one of maintained and raised in the case of remaining harvested crop.

5. A self-propelled harvesting machine, having an internal combustion engine, an electronic control arrangement coupled to the internal combustion engine and providing as input the rotational speed of the internal combustion engine, and being provided with information about whether the harvesting machine is in operation on public roads or in a harvesting operation, wherein the control arrangement is operated during the harvesting operation so as to provide as input in an automatic operating mode the rotational speed of the internal combustion engine as a function of an operating situation of the harvesting machine automatically recognized by the control arrangement according to claim 1, wherein a situation of the harvesting operation recognized by the control arrangement is the operation in a field that is to be harvested, recognized on the basis of at least one of information regarding the engagement of a clutch in the driveline of the operating devices required for the harvesting operation, the method of operation of an intake conveyor, and the forward propulsion velocity, and wherein the control arrangement is operated so as to bring the rotational speed of the internal combustion engine to one of a maximum and a selected rotational speed for the operation of the harvesting machine into the field to be harvested.

6. A self-propelled harvesting machine, having an internal combustion engine, an electronic control arrangement coupled to the internal combustion engine and providing as input the rotational speed of the internal combustion engine, and being provided with information about whether the harvesting machine is in operation on public roads or in a harvesting operation, wherein the control arrangement is operated during the harvesting operation so as to provide as input in an automatic operating mode the rotational speed of the internal combustion engine as a function of an operating situation of the harvesting machine automatically recognized by the control arrangement, wherein the control arrangement is operated so as to bring the rotational speed of the internal combustion engine after the entry of the harvesting machine into a field that is to be harvested has been recognized on the basis of an increased power requirement of the internal combustion engine to lower the rotational speed of the internal combustion engine automatically to a value that corresponds to one of a maximum power output that can be developed and a local minimum of the specific fuel consumption.

7. A self-propelled harvesting machine according to claim 6, wherein the control arrangement is operated so as to leave the rotational speed of the internal combustion engine constant initially with increasing load until a certain first value of the power output has been reached, and upon further increasing load to reduce the rotational speed continuously until at a second value of the power output the rotational speed has been reached, that corresponds to one of the maximum power output that can be developed and a local minimum of the specific fuel consumption.

8. A self-propelled harvesting machine according to claim 6, wherein the control arrangement is operated after reaching a rotational speed, that corresponds to one of a maximum power output that can be developed and a minimum specific fuel consumption, and to hold the rotational speed of the internal combustion engine at first constant when the power output is reduced, until a third value of the power output has been reached, that is lower than the second power output and then to increase the rotational speed continuously while the power output is reduced further, until at a fourth value of the power output, that is smaller than the first value of the power output, the maximum rotational speed is reached and to maintain this rotational speed with further reduced power output.

9. A self-propelled harvesting machine, having an internal combustion engine, an electronic control arrangement coupled to the internal combustion engine and providing as input the rotational speed of the internal combustion engine, and being provided with information about whether the harvesting machine is in operation on public roads or in a harvesting operation, wherein the control arrangement is operated during the harvesting operation so as to provide as input in an automatic operating mode the rotational speed of the internal combustion engine as a function of an operating situation of the harvesting machine automatically recognized by the control arrangement, wherein the control arrangement is operated to bring the rotational speed of the internal combustion engines to the maximum rotational speed when a discharge arrangement of the harvesting machine is directed to the rear.

10. A self-propelled harvesting machine, having an internal combustion engine, an electronic control arrangement coupled to the internal combustion engine and providing as input the rotational speed of the internal combustion engine, and being provided with information about whether the harvesting machine is in operation on public roads or in a harvesting operation, wherein the control arrangement is operated during the harvesting operation so as to provide as input in an automatic operating mode the rotational speed of the internal combustion engine as a function of an operating situation of the harvesting machine automatically recognized by the control arrangement, wherein the control arrangement is operated so as to raise the rotational speed of the internal combustion engine above a value of the rotational speed that corresponds to one of a maximum power output that can be developed and a minimum specific fuel consumption when harvested crop throughput is below a certain threshold value.

11. A self-propelled harvesting machine according to claim 1 wherein the control arrangement is connected to an operator input arrangement with which the operator can select at least one of an automatic operating mode, an efficient operating mode, and a manual operating mode.

12. A self-propelled harvesting machine according to claim 1 wherein the machine is equipped with several internal combustion engines whose crankshafts are coupled to each other and the engines are connected to the control arrangement.

13. A self-propelled harvesting machine according to claim 4, wherein the control arrangement is operated so as to recognize the situation of the harvesting operation on the basis of one of: operator input; and adjusting magnitudes influenced by an operator's input, that are used for the control of the forward propulsion drive, and the harvesting operation of the harvesting machine.

14. A self-propelled harvesting machine according to claim 4, wherein the control arrangement is connected with a switch with which an operator can switch from an operation on public roads to a harvesting operation and is operated so as to recognize the harvesting operation on the basis of the position of the switch.

15. A self-propelled harvesting machine according to claim 4 wherein the control arrangement is connected to an operator input arrangement with which the operator can select at least one of an automatic operating mode, an efficient operating mode, and a manual operating mode.

16. A self-propelled harvesting machine according to claim 4 wherein the machine is equipped with several internal combustion engines whose crankshafts are coupled to each other and the engines are connected to the control arrangement.

17. A self-propelled harvesting machine according to claim 5, wherein the control arrangement is operated so as to recognize the situation of the harvesting operation on the basis of one of: operator input; and adjusting magnitudes influenced by an operator's input, that are used for the control of the forward propulsion drive, and the harvesting operation of the harvesting machine.

18. A self-propelled harvesting machine according to claim 5, wherein the control arrangement is connected with a switch with which an operator can switch from an operation on public roads to a harvesting operation and is operated so as to recognize the harvesting operation on the basis of the position of the switch.

19. A self-propelled harvesting machine according to claim 5 wherein the control arrangement is connected to an operator input arrangement with which the operator can select at least one of an automatic operating mode, an efficient operating mode, and a manual operating mode.

20. A self-propelled harvesting machine according to claim 5 wherein the machine is equipped with several internal combustion engines whose crankshafts are coupled to each other and the engines are connected to the control arrangement.

21. A self-propelled harvesting machine according to claim 6, wherein the control arrangement is operated so as to recognize the situation of the harvesting operation on the basis of one of: operator input; and adjusting magnitudes influenced by an operator's input, that are used for the control of the forward propulsion drive, and the harvesting operation of the harvesting machine.

22. A self-propelled harvesting machine according to claim 6, wherein the control arrangement is connected with a switch with which an operator can switch from an operation on public roads to a harvesting operation and is operated so as to recognize the harvesting operation on the basis of the position of the switch.

23. A self-propelled harvesting machine according to claim 6 wherein the control arrangement is connected to an operator input arrangement with which the operator can select at least one of an automatic operating mode, an efficient operating mode, and a manual operating mode.

24. A self-propelled harvesting machine according to claim 6 wherein the machine is equipped with several internal combustion engines whose crankshafts are coupled to each other and the engines are connected to the control arrangement.

25. A self-propelled harvesting machine according to claim 9, wherein the control arrangement is operated so as to recognize the situation of the harvesting operation on the basis of one of: operator input; and adjusting magnitudes influenced by an operator's input, that are used for the control of the forward propulsion drive, and the harvesting operation of the harvesting machine.

26. A self-propelled harvesting machine according to claim 9, wherein the control arrangement is connected with a switch with which an operator can switch from an operation on public roads to a harvesting operation and is operated so as to recognize the harvesting operation on the basis of the position of the switch.

27. A self-propelled harvesting machine according to claim 9 wherein the control arrangement is connected to an operator input arrangement with which the operator can select at least one of an automatic operating mode, an efficient operating mode, and a manual operating mode.

28. A self-propelled harvesting machine according to claim 9 wherein the machine is equipped with several internal combustion engines whose crankshafts are coupled to each other and the engines are connected to the control arrangement.

29. A self-propelled harvesting machine according to claim 10, wherein the control arrangement is operated so as to recognize the situation of the harvesting operation on the basis of one of: operator input; and adjusting magnitudes influenced by an operator's input, that are used for the control of the forward propulsion drive, and the harvesting operation of the harvesting machine.

30. A self-propelled harvesting machine according to claim 10, wherein the control arrangement is connected with a switch with which an operator can switch from an operation on public roads to a harvesting operation and is operated so as to recognize the harvesting operation on the basis of the position of the switch.

31. A self-propelled harvesting machine according to claim 10 wherein the control arrangement is connected to an operator input arrangement with which the operator can select at least one of an automatic operating mode, an efficient operating mode, and a manual operating mode.

32. A self-propelled harvesting machine according to claim 10 wherein the machine is equipped with several internal combustion engines whose crankshafts are coupled to each other and the engines are connected to the control arrangement.

* * * * *